US012595907B2

(12) United States Patent
Binek et al.

(10) Patent No.: US 12,595,907 B2
(45) Date of Patent: Apr. 7, 2026

(54) INSPECTION PORT FOR AN ATTRITABLE ENGINE SUPPORT STRUCTURE

(71) Applicant: Raytheon Technologies Corporation, Farmington, CT (US)

(72) Inventors: Lawrence A. Binek, Glastonbury, CT (US); Evan J. Butcher, Suffield, CT (US); Sean R. Jackson, Palm City, FL (US)

(73) Assignee: RTX CORPORATION, Farmington, CT (US)

( * ) Notice: Subject to any disclaimer, the term of this patent is extended or adjusted under 35 U.S.C. 154(b) by 693 days.

(21) Appl. No.: 16/692,077

(22) Filed: Nov. 22, 2019

(65) Prior Publication Data

US 2021/0156563 A1    May 27, 2021

(51) Int. Cl.
*F23R 3/06* (2006.01)
*F23R 3/00* (2006.01)
*F02C 7/25* (2006.01)

(52) U.S. Cl.
CPC .............. *F23R 3/002* (2013.01); *F23R 3/06* (2013.01); *F02C 7/25* (2013.01); *F23R 2900/00017* (2013.01); *F23R 2900/00018* (2013.01)

(58) Field of Classification Search
CPC .... F23R 3/002; F23R 3/06; F23R 2900/0017; F23R 2900/0018; F02C 7/25; F02C 7/26; F01D 21/003
See application file for complete search history.

(56) References Cited

U.S. PATENT DOCUMENTS

| | | | | |
|---|---|---|---|---|
| 3,778,170 A * | 12/1973 | Howell | .............. | G02B 23/2476 |
| | | | | 356/241.4 |
| 5,209,067 A * | 5/1993 | Barbier | .................... | F23R 3/08 |
| | | | | 60/757 |
| 6,931,862 B2 * | 8/2005 | Harris | .................... | F23R 3/286 |
| | | | | 60/804 |
| 6,941,760 B1 * | 9/2005 | Jones | .................... | F02C 7/268 |
| | | | | 60/727 |
| 10,005,239 B2 | 6/2018 | Versluys et al. | | |
| 10,174,947 B1 * | 1/2019 | Clemen | .................... | F23R 3/06 |
| 2006/0000219 A1 * | 1/2006 | Myhre | .................... | F01D 17/02 |
| | | | | 60/803 |
| 2007/0036942 A1 * | 2/2007 | Steele | .................... | F23M 11/00 |
| | | | | 428/131 |
| 2007/0227149 A1 * | 10/2007 | Biebel | .................... | F23R 3/06 |
| | | | | 60/752 |
| 2012/0125131 A1 * | 5/2012 | Sue | .................... | F01D 25/26 |
| | | | | 73/866.5 |
| 2013/0255265 A1 * | 10/2013 | Rudrapatna | .............. | F23R 3/16 |
| | | | | 29/889.22 |
| 2015/0316265 A1 * | 11/2015 | Dolmansley | .............. | F23R 3/04 |
| | | | | 60/39.821 |

(Continued)

*Primary Examiner* — Thomas P Burke
(74) *Attorney, Agent, or Firm* — Getz Balich LLC

(57)    ABSTRACT

A gas turbine engine includes an engine casing and a combustor liner enclosed within the engine casing. The engine includes a flow path for cooling the combustor liner with an air stream and located in between the engine casing and the combustor liner. The engine includes an inspection port penetrating the engine casing, the flow path, and the combustor liner and wherein the inspection port is positioned to allow an operator to view sacrificed zones of a sacrificial support structure.

19 Claims, 3 Drawing Sheets

(56) References Cited

U.S. PATENT DOCUMENTS

| | | | |
|---|---|---|---|
| 2015/0323183 A1* | 11/2015 | Butcher | F23R 3/002 |
| | | | 60/752 |
| 2017/0254537 A1* | 9/2017 | Cihlar | F23R 3/60 |
| 2018/0171873 A1 | 6/2018 | Purcell et al. | |
| 2018/0320801 A1* | 11/2018 | Yang | F16L 9/006 |
| 2019/0085767 A1* | 3/2019 | Vise | F23R 3/04 |
| 2019/0086081 A1 | 3/2019 | Bellardi | |

* cited by examiner 108    100

114

130

113

130    100

112

114

INSPECTION PORT FOR AN ATTRITABLE ENGINE SUPPORT STRUCTURE

BACKGROUND

The present disclosure relates generally to attritable aircraft engines. More specifically, this disclosure relates to a support structure within a combustor of an attritable aircraft engine.

Attritable aircraft can include, for example, Unpiloted (or Unmanned) Aerial Vehicles (UAVs) and expendable turbojet systems for guided munitions, missiles, and decoys. Attritable aircraft are generally designed as a limited lifetime vehicle, which can be as short as a single use or single mission vehicle. As such, many components and features common in traditional piloted aircraft are unnecessary or can be simplified for attritable aircraft applications.

For example, a combustion chamber within a traditional aircraft engine can have more than 25 individual parts, such as, a series of dilution chutes positioned along the combustor liner. Conventionally, each dilution chute needs to be brazed to the combustor liner and meet stringent geometry requirements, which is expensive and time consuming. The assembly process is verified by an inspection method.

There exist needs in various industries to reduce the number of manufactured parts for combustor assemblies, thereby providing more robust and simpler designs, which requires less maintenance, reduces manufacturing time and costs, and simplifies packaging. However, there is also a need to verify the manufactured product through inspection of the assembled engine without adding additional labor by requiring disassembly of the engine or by using overly laborious inspection techniques.

SUMMARY

A gas turbine engine includes an engine casing and a combustor liner enclosed within the engine casing. The engine includes a flow path for cooling the combustor liner with an air stream and located in between the engine casing and the combustor liner. The engine includes an inspection port penetrating the engine casing, the flow path, and the combustor liner and wherein the inspection port is positioned to allow an operator to view sacrificed zones of a sacrificial support structure.

A method of manufacturing a gas turbine engine includes additively manufacturing an engine casing, a combustor liner, an inspection port, a dilution chute, and a sacrificial support structure for supporting the dilution chute with respect to the combustor liner and sacrificing at least a portion of the sacrificial support structure. The method includes viewing, through the inspection port, the combustor liner and the dilution chute where at least a portion of the sacrificial support structure has been removed.

DETAILED DESCRIPTION

An attritable engine with an integrally built dilution chute with respect to a combustor liner and a means to inspect the assembled combustor is disclosed herein. The attritable engine leverages additive manufacturing techniques to improve various aspects of the limited-life engine. For example, additive manufacturing allows the assembly details to be unitized and, simultaneously permits integration of many complex performance-enhancing features. The additively manufactured engine reduces the time to delivery to the customer and lowers the overall production costs of the unit.

Figures 1, 2:
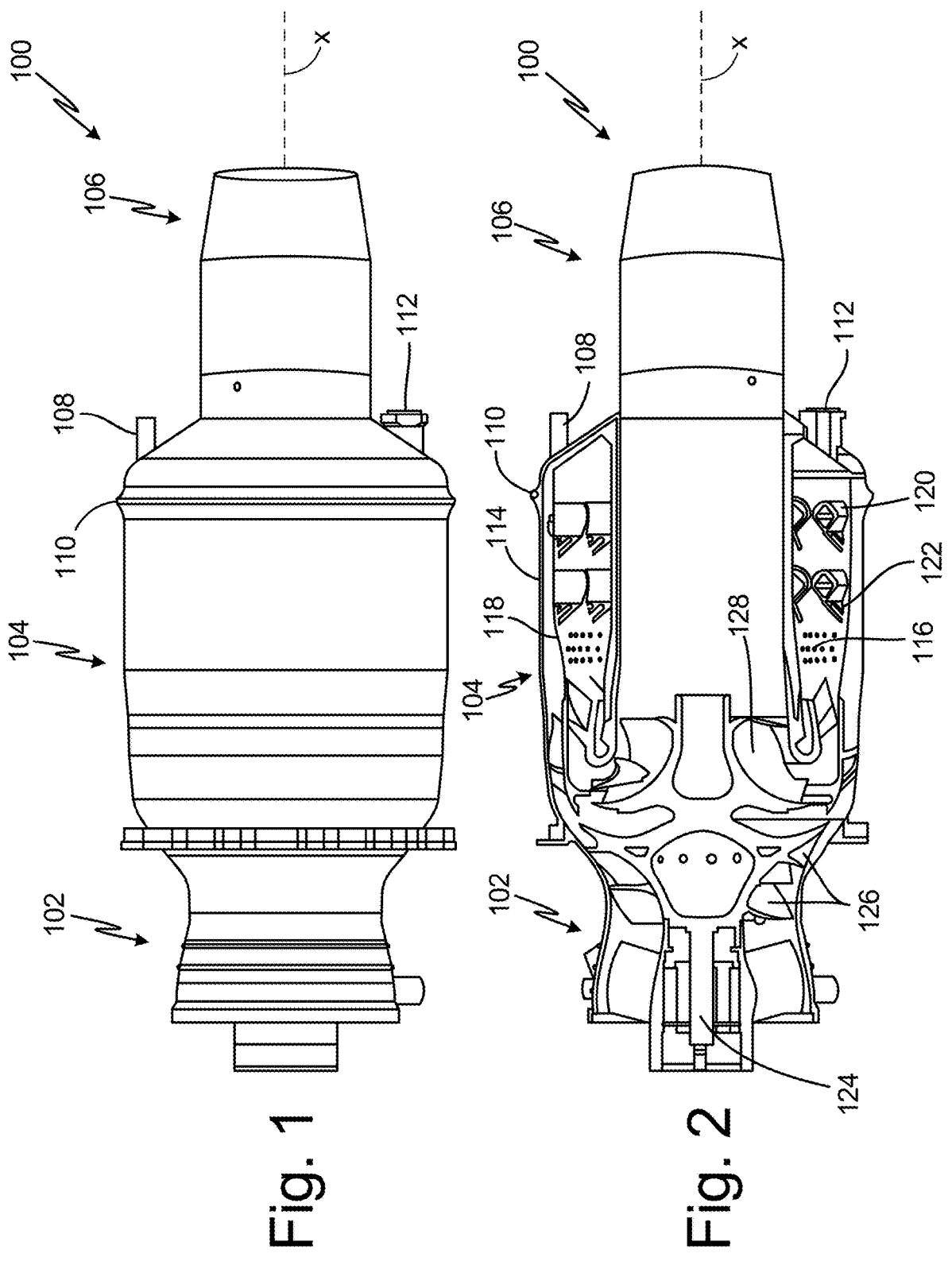
FIG. 1 is a side view of an attritable engine.
FIG. 2 is a cross-sectional view of an attritable engine.

FIG. 1 is a side view of an attritable engine. FIG. 1 shows attritable engine 100 including forward engine casing 102, rearward engine casing 104, exhaust casing 106, fuel inlet 108, fuel line 110, and igniter 112. Forward engine casing 102 encases a compressor section of attritable engine 100 and is connected to rearward engine casing 104, which encases combustion and turbine sections of attritable engine 100. Exhaust casing 106 is connected to rearward engine casing 104, opposing forward engine casing 102.

Rearward engine casing 104 has fuel inlet 108 and fuel line 110. Fuel inlet 108 is coupled to a fluid source such as a fuel tank. Fuel inlet 108 is configured to deliver fuel to fuel line 110, which is formed integral and conformal with rearward engine casing 104. Fuel line 110 travels circumferentially around engine casing 104 and can deliver fuel at multiple sites along the circumferential path. The delivered fuel is injected into combustion chambers and ignited by igniter 112.

FIG. 2 is a cross-sectional view of an attritable engine. FIG. 2 shows attritable engine 100 including forward engine casing 102, rearward engine casing 104, exhaust casing 106, fuel inlet 108, fuel line 110, igniter 112, engine casing wall 114, combustor 116, combustor liner 118, dilution chutes 120, support structures 122, rotor 124, compressor blades 126, turbine blades 128, and axis of rotation X. In the illustrated embodiment, attritable engine 100 shows forward engine casing 102 lying forward and adjacent to rearward engine casing 104, which is defined by engine casing wall 114 and positioned forward of exhaust casing 106. Although combustor 116 lies physically aft of the turbine section, combustor 116 fluidically sits between the compressor section in forward engine casing 102 and the turbine section. This arrangement may be referred to as a reverse flow combustor.

Combustor 116 is defined by combustor liner 118 and is spaced apart from engine casing wall 114 in a radially inward direction toward axis of rotation X to allow fluid flow between engine casing wall 114 and combustor liner 118. Dilution chute 120 and support structure 122 are made integral and conformal with combustor liner 118. Dilution chute 120 penetrates combustor liner 118 and allows fluid to enter into combustor 116. Support structure 122 supports dilution chute 120 during the build process with reference to combustor liner 118. Rotor 124 extends along the axis of rotation X into both forward engine casing 102 and rearward engine casing 104. Attached to rotor 124 are compressor blades 126 and turbine blades 128.

Figure 5:
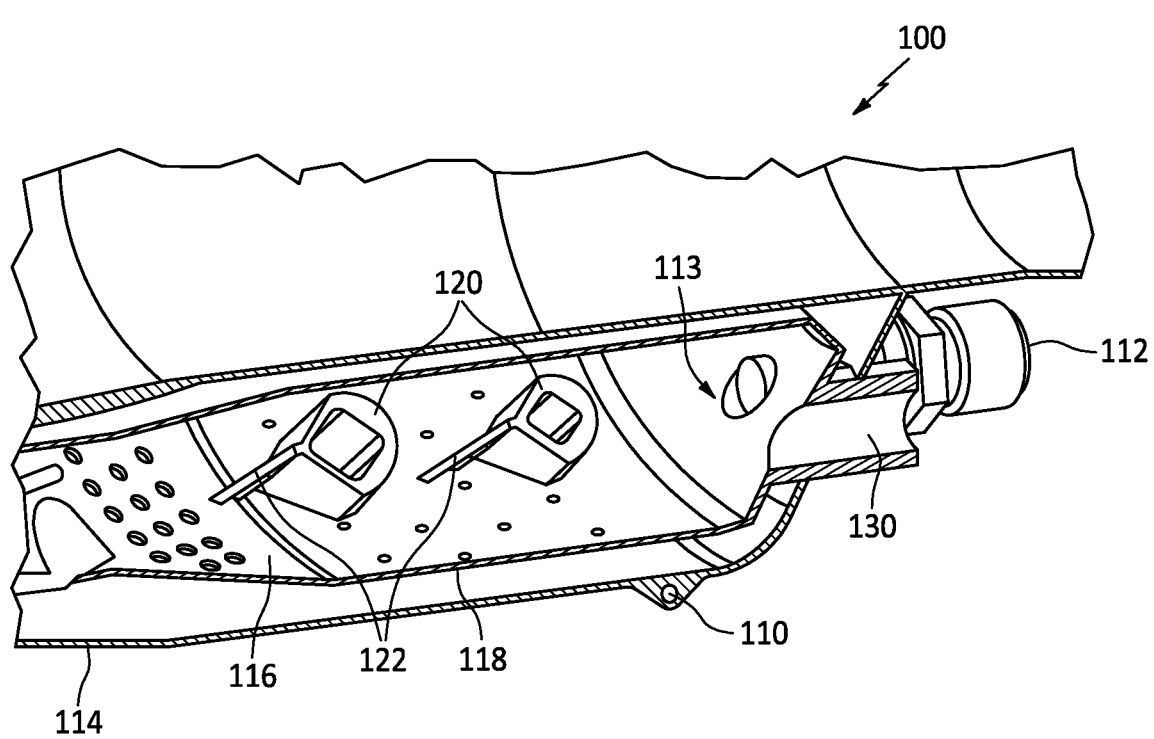
FIG. 5 is a cross-sectional view of a portion of an attritable engine with an inspection port.

A combustor may include more than one dilution chute as shown in FIGS. 2 and 5. The combustor may include more than one type of dilution chute. For example, the combustor may include primary dilution chutes for allowing atomized fuel and air to enter the combustor and the combustor may also include secondary dilution chutes for allowing additional air to enter the combustor. In the illustrated embodiments in FIGS. 2 and 5, each combustor 116 in attritable engine 100 includes twelve primary and twelve secondary dilution chutes with each set being circumferentially arranged around combustor liner 118. The placement, number, and orientation of the dilution chutes can be optimized for fuel efficiency. Factors which may influence these parameters are, for example, engine size, engine load and/or demand requirements, materials used in the build process, and engine cooling requirements.

Support structures 122 support dilutions chutes 120 during the build process. For example, using additive manufacturing techniques such as laser powder bed fusion, electron beam melting, and glue binder jetting, result in higher successful build rates if a support structure is provided when building at less than a 45° build angle. For further example, a dilution chute extending from the combustor liner at a 0° angle may have a comparatively high failure to build rate unless a support structure is provided.

Furthermore, the support structures may be temporary. In other words, the support structures are built along with the dilution chutes during the build process, but can be sacrificed after the dilution chutes are built. For example, the support structures can be built such that they are removed during a thermal treatment step such as during an initial firing of the engine or a test run of the engine. To this end, the support structures can include cut outs, can have a variable height as the support structure extends away from the dilution chute, and can be relatively thin. For example, the height of the support structure at the point of attachment to the dilution chute can be 0.5 in. and decrease as the support structure extends away from the dilution chute. In some embodiments, the height can be from 0.25 in. to 0.75 in., inclusive. For further example, the width of the support structure can be 0.030 in. In some embodiments, the width can be from 0.020 in. to 0.040 in., inclusive.

The support structure can also be built offset from the center of a combustor flow path such that the support structure is at least partially in the flow path, which can not only help to remove the support structure quickly, but also remove the support structure more completely compared to a support structure aligned with the flow path. Substantially complete removal of the support structure is desirable since any obstruction in the flow path can decrease the overall efficiency of the engine.

Operationally, air enters the forward end of a compressor section encased by forward engine casing 102 and is compressed by compressor blades 126. Compressed air along with fuel enters combustor 116 through dilution chutes 120 where the compressed air and fuel are combusted. The combusted fuel and compressed air from combustor 116 enters a turbine section encased by rearward engine casing 104 and turns turbine blades 128 circumferentially around rotational axis X, which generates power by also turning rotor 124. The air exits out of the aft end of exhaust casing 106.

Figure 3:
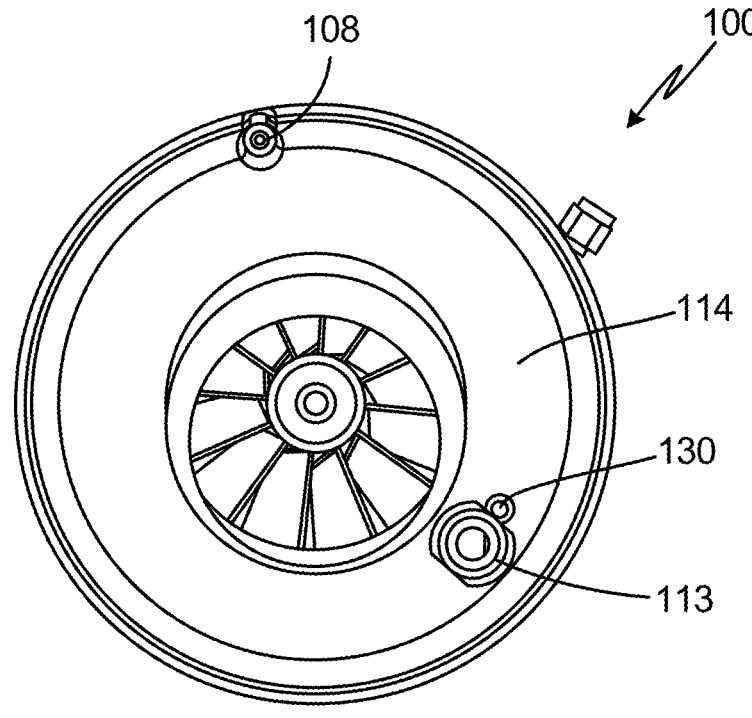
FIG. 3 is an end view of an attritable engine with an inspection port.

FIG. 3 is an end view of an attritable engine with an inspection port. FIG. 3 shows attritable engine 100 including fuel inlet 108, igniter inlet 113, engine casing wall 114, and inspection port 130. The igniter has been removed in FIG. 3 and shows igniter inlet 113. Both igniter inlet 113 and inspection port 130 penetrate engine casing wall 114, and combustor liner 118, and the fluid channel, defined by engine casing wall 114 and combustor liner 118. Inspection port 130 is positioned adjacent to igniter inlet 113. Inspection port

130 can lie on the same circumferential arc around rotational axis X as igniter inlet 113. Having the inspection port 130 positioned adjacent to igniter inlet 113 and on the same circumferential arc around rotational axis X as igniter inlet 113 can reduce the amount of blockage of a fluid through the fluid channel compared to inspection port 130 being located away from the igniter inlet.

Figure 4:
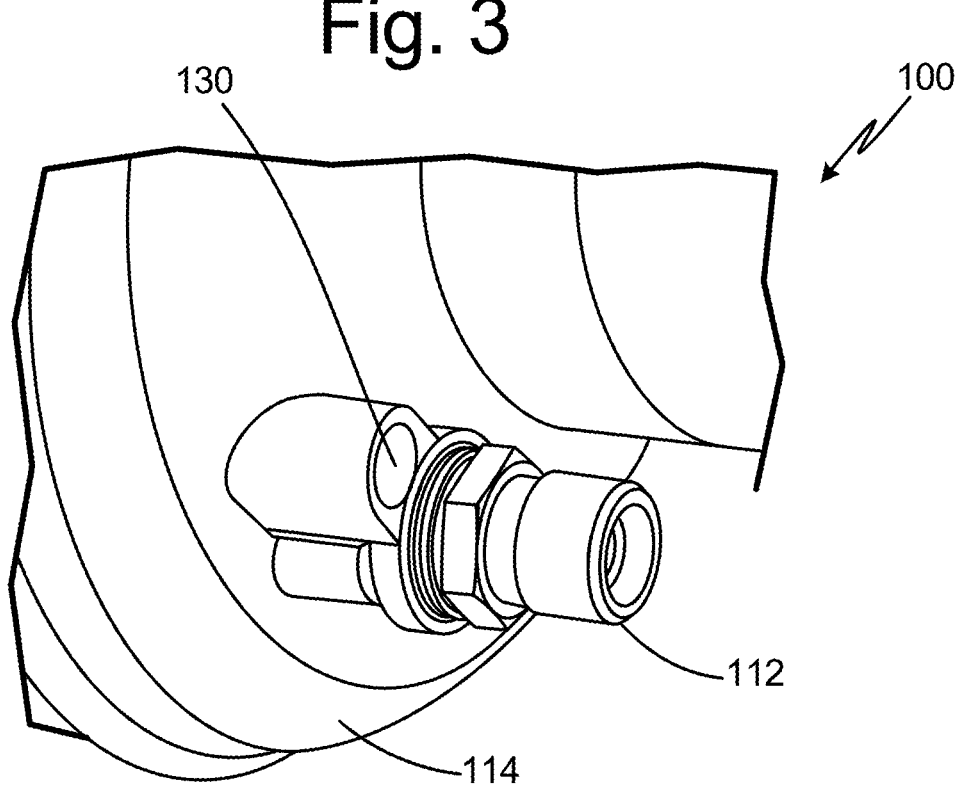
FIG. 4 is a perspective view of a rear portion of an attritable engine with an inspection port.

FIG. 4 is a perspective view of a rear portion of an attritable engine with an inspection port. FIG. 4 shows attritable engine 100 including igniter 112, engine casing wall 114, and inspection port 130. Although inspection port 130 is illustrated in FIG. 4 on the clockwise side of igniter 112, inspection port 130 can be located on either side of igniter 112. For example, FIG. 3 shows inspection port 130 located on the counter-clockwise side of igniter 112.

FIG. 5 is a cross-sectional view of a portion of an attritable engine with an inspection port. FIG. 5 shows attritable engine 100 including rearward engine casing 104, fuel line 110, igniter 112, igniter inlet 113, engine casing wall 114, combustor 116, combustor liner 118, dilution chutes 120, support structures 122, and inspection port 130. In the illustrated embodiment, igniter 112 is located within igniter inlet 113 and can be held in place by one or more seals.

Operationally, compressed air from a compressor section, which is encased by forward engine casing 102, flows through a fluid channel defined by engine casing wall 114 and combustor liner 118. The compressed air flows around the walls defining inspection port 130 and igniter inlet 113. The compressed air can enter combustor 116 through dilution chutes 120, cooling holes, or through a combustor nozzle. As the compressed air and fuel enter into combustor 116 either igniter 112 provides an ignition source for a cold engine or continuous combustion occurs for a hot engine. The combusted products exit combustor 116 through the turbine section encased by rearward engine casing 104.

Inspection port 130 is sized and oriented to allow inspection of the support structures within the combustor. For example, a borescope can be inserted through inspection port 130 and manipulated, enabling a user to view support structures 122. Although, igniter 112 can be removed from igniter inlet 113 and a borescope inserted through the igniter inlet, the igniter seals would need to be changed upon replacement of the igniter in the igniter inlet. Alternatively, the borescope can be fed through the exhaust and turbine sections, but the borescope may not reach all the way to the combustor. Both of these techniques are time and labor intensive.

Inspection port 130 can be used to evaluate the build process of structures within the combustor such as support structures 122 or inspection port 130 can be used to evaluate the removal of sacrificial support structures 122 after a sacrificial treatment step such as heat treatment. For example, sacrificial support structures 122 can be designed to be quickly removed during an initial start-up of the engine or during a test firing of the engine, both of which can generate significant heat within the combustor. A borescope can be inserted through inspection port 130 to evaluate the removal process of sacrificial support structures 122. Inspection port 130 is capped when not in use by, for example, a compression fitting.

Figure 6:
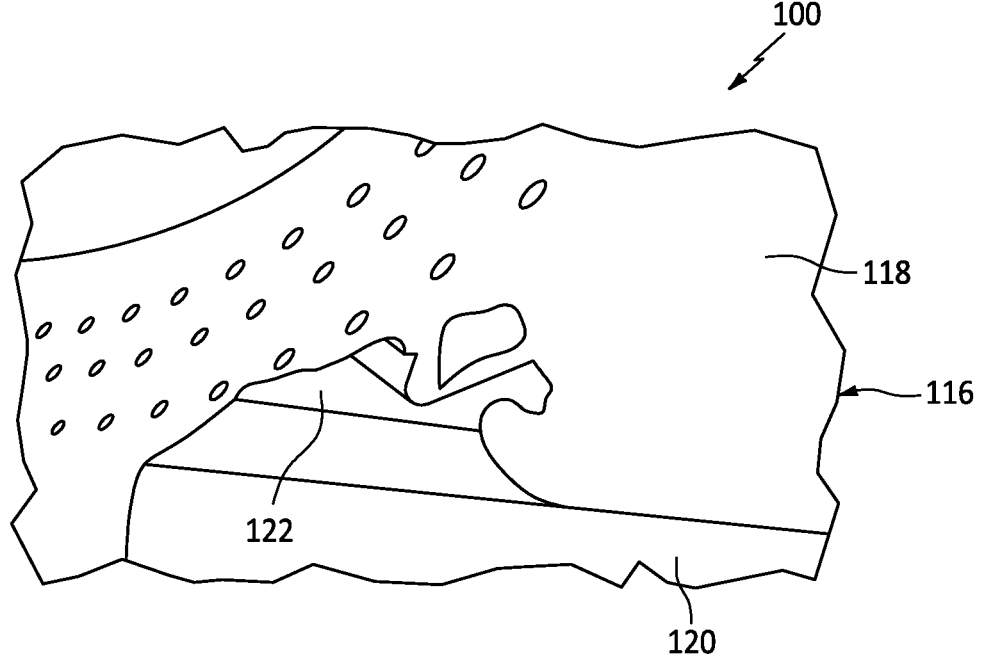
FIG. 6 is a photograph of a combustor interior with a partially sacrificed support structure.

FIG. 6 is a photograph of a combustor interior with a partially sacrificed support structure. FIG. 6 shows combustor 116 of attritable engine 100 including combustor liner 118, dilution chute 120, and sacrificial support structure 122. As shown in the photograph, support structure 122 is partially removed. Incomplete removal of the sacrificial support structure can leave behind bumps, ridges, or peaks on the surface of the combustor liner or the dilution chute. Similarly, as the sacrificial support structure is removed, fragments or pieces of the sacrificial support structure may be deposited on the surfaces of downstream structures in the flow path of the engine such as, for example, a turbine vane, turbine blade, or the exhaust duct wall.

Inspection port 130 allows a user to view and inspect structural features within the combustor such as sacrificial support structures used during the manufacturing process and subsequent removal of the sacrificial support structures. The inspection port allows viewing access within the combustor with less time and labor expended compared to using other techniques such as removal and re-insertion of the igniter or feeding a borescope through the exhaust and turbine sections. Additionally, the inspection port can be placed to minimize blockage of the compressor air flow path.

Discussion of Possible Embodiments

The following are non-exclusive descriptions of possible embodiments of the present invention.

A gas turbine engine includes an engine casing and a combustor liner enclosed within the engine casing. The engine includes a flow path for cooling the combustor liner with an air stream and located in between the engine casing and the combustor liner. The engine includes an inspection port penetrating the engine casing, the flow path, and the combustor liner and wherein the inspection port is positioned to allow an operator to view sacrificed zones of a sacrificial support structure.

The engine of the preceding paragraph can optionally include, additionally and/or alternatively, any one or more of the following features, configurations and/or additional components:

The inspection port is adjacent to an ignitor.

The inspection port and the ignitor lie on a common circumferential curve relative to an axis of rotation.

The engine includes a dilution chute penetrating the combustor liner, wherein the dilution chute is adjacent to the sacrificial support structure.

The dilution chute is additively manufactured and the sacrificial support structure supports the additively manufactured dilution chute with respect to the combustor liner.

The inspection port is configured to allow viewing of bumps, ridges, or peaks from incomplete removal of the sacrificial support structure on a surface of the combustor liner or the dilution chute.

The inspection port is configured to allow viewing of bumps, ridges, or peaks on a surface of a turbine vane, turbine blade, or an exhaust duct wall, wherein the bump, ridge, or peak is from the removal of a support structure in the combustor and at least a portion of the support structure is deposited on the turbine vane, turbine blade, or the exhaust duct wall.

The inspection port is configured to allow viewing of a carbon scorch pattern on a surface of the dilution chute or the combustor liner, the scorch pattern being indicative of the presence of the sacrificial support structure within a combustor during at least a portion of the engine's useful life.

A gas turbine engine includes an engine casing and a combustor liner enclosed within the engine casing. The engine includes a flow path for cooling the combustor liner with an air stream and located in between the engine casing and the combustor liner. The engine includes a dilution chute penetrating the combustor liner and a sacrificial support structure attached to the dilution chute and the combustor liner. The engine includes an inspection port penetrating the engine casing, the flow path, and the combustor liner and wherein the inspection port is positioned to allow an operator to view sacrificed zones of a sacrificial support structure.

The engine of the preceding paragraph can optionally include, additionally and/or alternatively, any one or more of the following features, configurations and/or additional components:

The support structure is configured to be removed by a thermal process, which increases the overall efficiency of the engine.

The support structure has a width from 0.020 in. to 0.040 in., inclusive.

The support structure has a height from 0.25 in. to 0.75 in., inclusive.

The inspection port is adjacent to an ignitor.

The inspection port and the ignitor lie on a common circumferential curve relative to an axis of rotation.

A method of manufacturing a gas turbine engine includes additively manufacturing an engine casing, a combustor liner, an inspection port, a dilution chute, and a sacrificial support structure for supporting the dilution chute with respect to the combustor liner and sacrificing at least a portion of the sacrificial support structure. The method includes viewing, through the inspection port, the combustor liner and the dilution chute where at least a portion of the sacrificial support structure has been removed.

The method of the preceding paragraph can optionally include, additionally and/or alternatively, any one or more of the following features, configurations and/or additional components:

Sacrificing at least a portion of the sacrificial support structure is by using a thermal process.

The thermal process is an initial start-up of the engine or an initial testing of the engine.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine comprising:

an engine casing;

a combustor liner enclosed within the engine casing;

a flow path for cooling the combustor liner with an air stream and located in between the engine casing and the combustor liner;

a dilution chute projecting out from the combustor liner;

a support structure extending between the combustor liner and the dilution chute, the support structure configured to support the dilution chute during manufacturing where the support structure is additively manufactured with the combustor liner and the dilution chute as a unitized body; and an inspection port penetrating the engine casing, the flow path, and the combustor liner, the inspection port positioned to allow an operator to view a zone of the support structure;

wherein the inspection port is circumferentially adjacent an ignitor such that the inspection port and an ignitor inlet for the ignitor penetrate through a common section of the combustion liner.

2. The gas turbine engine of claim 1, wherein the inspection port and the ignitor lie on a common circumferential curve relative to an axis of rotation.

3. The gas turbine engine of claim 1, wherein the dilution chute penetrates the combustor liner, and the dilution chute is adjacent to the support structure.

4. The gas turbine engine of claim 3, wherein the zone of the support structure supports the additively manufactured dilution chute with respect to the combustor liner.

5. The gas turbine engine of claim 3, wherein the zone of the support structure is a sacrificial zone, and the inspection port is configured to allow viewing of bumps, ridges, or peaks from incomplete removal of the sacrificial zone of the support structure on a surface of the combustor liner or the dilution chute.

6. The gas turbine engine of claim 3, wherein the inspection port is configured to allow viewing of bumps, ridges, or peaks on a surface of a turbine vane, a turbine blade, or an exhaust duct wall, wherein the bumps, the ridges, or the peaks are from the removal of a sacrificial zone of the support structure in a combustor and at least a portion of the sacrificial zone of the support structure is deposited on the turbine vane, the turbine blade, or the exhaust duct wall.

7. The gas turbine engine of claim 3, wherein the inspection port is configured to allow viewing of a carbon scorch pattern on a surface of the dilution chute or the combustor liner, the carbon scorch pattern being indicative of presence of the support structure within a combustor during at least a portion of a useful life of the gas turbine engine.

8. A gas turbine engine comprising:
an engine casing;
a combustor liner enclosed within the engine casing;
a flow path for cooling the combustor liner with an air stream and located in between the engine casing and the combustor liner;
a dilution chute penetrating the combustor liner;
a sacrificial support structure attached to the dilution chute and the combustor liner; and
an inspection port penetrating the engine casing, the flow path, and the combustor liner, the inspection port positioned to allow an operator to view a portion of the sacrificial support structure, the inspection port formed by a sidewall that projects out from the combustor liner and through the engine casing, and the sidewall is formed integral with the combustor liner;
wherein an outer surface of the sidewall extends longitudinally from the engine casing to the combustor liner, and the outer surface has a straight sectional geometry from the engine casing to the combustor liner.

9. The gas turbine engine of claim 8, wherein the sacrificial support structure is configured to be removed by a thermal process, which increases the overall efficiency of the gas turbine engine.

10. The gas turbine engine of claim 8, wherein the sacrificial support structure has a width from 0.020 in. to 0.040 in., inclusive.

11. The gas turbine engine of claim 8, wherein the sacrificial support structure has a height from 0.25 in. to 0.75 in., inclusive.

12. The gas turbine engine of claim 8, wherein the inspection port is adjacent to an ignitor.

13. The gas turbine engine of claim 12, wherein the inspection port and the ignitor lie on a common circumferential curve relative to an axis of rotation.

14. The gas turbine engine of claim 1, wherein the zone of the support structure has at least one of: a variable height, a width from 0.020 in. to 0.040 in., inclusive, and a plurality of cut out sections.

15. The gas turbine engine of claim 8, wherein the sacrificial support structure has at least one of: a variable height, and a plurality of cut out sections.

16. The gas turbine engine of claim 8, wherein the dilution chute extends from the combustor liner at an angle of less than 45 degrees.

17. A gas turbine engine, comprising:
an engine casing;
a combustor liner within the engine casing;
a dilution chute projecting out from the combustor liner into a combustion chamber;
a support structure connected to and extending between the combustor liner and the dilution chute; and
an inspection port extending through the engine casing and the combustor liner to the combustion chamber, the inspection port formed by a sidewall connected to the combustor liner, and the sidewall extending across a cavity that is formed by and that extends between the combustor liner and the engine casing;
wherein an outer surface of the sidewall has a straight sectional geometry as the sidewall extends across the cavity from the engine casing to the combustor liner.

18. The gas turbine engine of claim 17, wherein the support structure is formed integral with the combustor liner and the dilution chute in a unitary body.

19. The gas turbine engine of claim 1, wherein
the inspection port is formed by a sidewall connected to the combustor liner;
the sidewall extends across a cavity that is formed by and that extends between the combustor liner and the engine casing; and
an outer surface of the sidewall has a straight sectional geometry as the sidewall extends across the cavity from the engine casing to the combustor liner.

* * * * *